United States Patent [19]
Adachi et al.

[11] Patent Number: 5,315,593
[45] Date of Patent: May 24, 1994

[54] COMMUNICATION CONTROL UNIT

[75] Inventors: Osamu Adachi, Hiratsuka; Kazunori Hoshi, Yokohama, both of Japan

[73] Assignee: Ricoh Company, Ltd., Tokyo, Japan

[21] Appl. No.: 816,581

[22] Filed: Jan. 3, 1992

[30] Foreign Application Priority Data

| Jan. 8, 1991 | [JP] | Japan | 3-11484 |
| Jan. 8, 1991 | [JP] | Japan | 3-11485 |
| Jan. 8, 1991 | [JP] | Japan | 3-11486 |
| Jan. 8, 1991 | [JP] | Japan | 3-11487 |
| Jan. 8, 1991 | [JP] | Japan | 3-11489 |
| Mar. 20, 1991 | [JP] | Japan | 3-56394 |

[51] Int. Cl.$^5$ ............................................. H04L 12/28
[52] U.S. Cl. .................................. 370/94.3; 370/85.4; 370/85.1; 370/85.3
[58] Field of Search ............... 370/94.3, 85.4, 85.13, 370/85.1, 85.14, 85.3

[56] References Cited

U.S. PATENT DOCUMENTS 4,839,887 6/1989 Yano ................................. 370/60
4,850,042 7/1989 Petronio et al. ............... 370/85.13

*Primary Examiner*—Douglas W. Olms
*Assistant Examiner*—Russell W. Blum
*Attorney, Agent, or Firm*—Oblon, Spivak, McClelland, Maier & Neustadt

[57] ABSTRACT

A communication control unit provides an interface between a node apparatus of a lattice communication network and a terminal in conformance with a token ring network standard. The communication control unit includes a first memory for temporarily storing an input frame from the terminal, a second memory for temporarily storing an input frame from the lattice communication network, an input signal discriminator for discriminating a MAC frame which is used for ring management from the input frame from the terminal, a controller for controlling operation timings of at least the first and second memories, and a return path for returning the MAC frame to the terminal with a priority over other frame when the input signal discriminator discriminates the MAC frame.

21 Claims, 17 Drawing Sheets

COMMUNICATION CONTROL UNIT

BACKGROUND OF THE INVENTION

The present invention generally relates to communication control units, and more particularly to a communication control unit which is applicable to a multi-media communication typified by a local area network (LAN).

A multi-channel lattice communication network which is applicable to LANs, public line networks and particularly to a multi-media communication was previously proposed in a U.S. Pat. No. 4,839,887 in which the assignee is the same as the assignee of the present application. The proposed lattice communication network is analogous to nerve cells of a living body, and employs node apparatuses. Each node apparatus has a plurality of input and output channels and is used as a communication control element. Such node apparatuses are coupled in a multi-conjunction to form the lattice communication network. Each node apparatus transfers one of incoming digital signals according to a first-come-first-output logic.

The proposed lattice communication network has a large degree of freedom of network topology because of the multi-conjunction architecture. Thus, the survival rate of data is high. In other words, even when a fault occurs in a path of the communication network, it is possible to carry out the communication through other paths. Furthermore, it is possible to select optimum paths for the communication because each node apparatus transfers the incoming digital signals according to the first-come-first-output logic.

On the other hand, the proposed lattice communication network employs a multi-channel system in which a plurality of connecting channels are established, so as to effectively achieve a full duplex communication. The proposed lattice communication network is effectively applicable to the physical layer to the network layer of the open system interconnection (OSI), for example.

As other networks, there is the token ring network employing the ring topology of IEEE 802.5. A description of the algorithm of this token ring network will be omitted in this specification. The token ring network has superior security functions in that all terminals are synchronized, only the terminal which has a free token (that is, a token which indicates the right to transmit) is authorized to make a transmission, message information is returned to a transmitting terminal thereby making it possible to confirm whether or not the message information is correctly received by a receiving terminal and the like. Moreover, the token ring network has a satisfactory throughput delay characteristic when the traffic is high.

However, according to the token ring network, the transmitting terminal cannot start the transmission until the free token makes one round of the network, and the waiting time tends to become long. In addition, the performance of the token ring network deteriorates with system expansion. That is, in the token ring network, the time it takes for the free token to reach a terminal becomes longer as the number of terminals increases, and furthermore, the traffic becomes high at the same time, thereby making it even longer for the free token to reach a terminal. The token ring network also has a problem in that the survival rate of data is poor because the network is greatly affected by a fault in a center ring.

On the other hand, the proposed lattice communication network does not have the concept of address, and can be regarded as "a cable which has a predetermined algorithm". In other words, the proposed lattice communication network does not require a fixed protocol, and it is thus possible to connect terminals which use various protocols. Accordingly, when a system is formed by connecting the terminals of the token ring network to the lattice communication network, it is possible to anticipate elimination of the problems of the token ring network and realization of a token ring network which displays the advantageous features of the lattice communication network.

However, it is impossible to simply connect the terminals of the token ring network to the lattice communication network, and at least an interface unit is required to connect the token ring network and the lattice communication network. Such an interface unit and a token ring network adaptive unit (TAU) are further disclosed in a U.S. patent application Ser. No. 631,274 filed Dec. 20, 1990, the disclosure of which is hereby incorporated by reference.

On the other hand, the token ring network treats various kinds of frame signals. Hence, if a medium access control (MAC) frame which is used for ring management is transmitted from the terminal of the token ring network to the lattice communication network, the MAC frame may disappear in the lattice communication network due to a collision generated therein.

In addition, in the TAU described above, no special consideration is given as to the treatment of broadcast signals treated in the lattice communication network, and the broadcast signals are treated similarly as the frames having the usual individual addresses. As a result, the broadcast signal will not return to the transmitting terminal when the broadcast signal is transmitted, and the transmitting terminal in this case processes this situation as an abnormal state.

Furthermore, in the TAU described above, no retiming control can be made independently for the input frame from the lattice communication network and the input frame from the terminal. Moreover, a collision may occur between the two input frames.

In the TAU described above, the frame is transmitted to the lattice communication network on the assumption that the other end is active. Hence, even when the frame is transmitted to the lattice communication network, the frame does not necessarily return to the transmitting terminal if the power source of the terminal on the other end or the TAU is OFF. As a result, the transmitting terminal may see this non-return of the frame as a failure of the entire network such as a cable failure, and cannot appropriately cope with the situation.

On the other hand, when connecting the lattice communication network and the toke ring network, no measures are taken to avoid collision due to the detection of identical addresses and to transmit the carrier in advance. In other words, in the terminal of the token ring network, the collision which does not occur in the token ring network is generated by the connection to the lattice communication network. If the TAU detects the collision, the transmitting frame and the receiving frame are both cut off. As a result, when the collision is generated, the transmitting frame does not return to the transmitting terminal. Even if the transmitting frame does return to the transmitting terminal, the returned frame will not be complete in form and may be cut off at an intermediate part of the frame. Such a frame which is not complete in form may be input to the receiving terminal. Since such errors are not generated in the normal token ring network, the errors become treated as fatal errors and the terminal enters a complex process such as initializing the ring. Therefore, the communication efficiency becomes extremely poor.

In addition, if the destination address of the input frame from the lattice communication network is the address of its own station, this frame is transmitted from the TAU to the terminal and the frame is returned to the TAU from the terminal to be transmitted to the lattice communication network via the TAU. For this reason, the returning of the answer signal to the lattice communication network is delayed when the frame passes through the normal path, and it may be impossible to return the answer signal within the time in which the path is fixed.

SUMMARY OF THE INVENTION

Accordingly, it is a general object of the present invention to provide a novel and useful communication control unit in which the problems described above are eliminated.

Another and more specific object of the present invention is to provide a communication control unit for providing an interface between a node apparatus of a lattice communication network and a terminal in conformance with a token ring network standard, comprising first memory means for temporarily storing an input frame from the terminal, second memory means for temporarily storing an input frame from the lattice communication network, input signal discriminator means, coupled to the second memory means, for discriminating a MAC frame which is used for ring management from the input frame from the terminal, control means, coupled to the first and second memory means and the input signal discriminator means for controlling operation timings of at least the first and second memory means, and a return path for returning the MAC frame to the terminal with a priority over other frames when the input signal detects means discriminates the MAC frame. According to the communication control unit of the present invention, it is possible to avoid disappearance of the frame due to a collision in the lattice communication network, and the management of the free token network can be maintained.

Still another object of the present invention is to provide a communication control unit for providing an interface between a node apparatus of a lattice communication network and a terminal in conformance with a token ring network standard, comprising first memory means for temporarily storing an input frame from the terminal, second memory means for temporarily storing an input frame from the lattice communication network, input signal discriminator means, coupled to the second memory means, for discriminating a broadcast signal from the input frame from the terminal, control means, coupled to the first and second memory means and the input signal discriminator means for controlling operation timings of at least the first and second memory means, and an output path for outputting the broadcast signal to the lattice communication network when the input signal discriminator means discriminates the broadcast signal. According to the communication control unit of the present invention, the broadcast signal simply passes through the communication control unit and will not be treated as an abnormality, thereby ensuring a positive interface and a quick transfer of the broadcast signal.

A further object of the present invention is to provide a communication control unit for providing an interface between a node apparatus of a lattice communication network and a terminal in conformance with a token ring network standard, comprising memory means for temporarily storing a frame which is to be transmitted from the terminal to another destination terminal and for transmitting the stored frame to the lattice communication network, control means, coupled to the memory means and including timer means, for controlling an operation timing of the memory means, where the timer means times a predetermined time after transmission of the frame to the lattice communication network, detector means for detecting a frame which is returned from the other destination terminal, and a return path for returning the frame from the memory means to the terminal if the frame is not returned from the lattice communication network within the predetermined time timed by the timer means. According to the communication control unit of the present invention, a failure such as a power failure at the destination terminal can be treated independently of a failure in the communication network.

Another object of the present invention is to provide a communication control unit for providing an interface between a node apparatus of a lattice communication network and a terminal in conformance with a token ring network standard, comprising first memory means for temporarily storing a frame which is to be transmitted from the terminal to another destination terminal and for transmitting the stored frame to the lattice communication network, second memory means for storing the frame when transmitting the frame, control means, coupled to the first memory means and including timer means, for controlling an operation timing of at least the first memory means, where the timer means times a predetermined time after transmission of the frame to the lattice communication network, detector means for detecting a frame which is returned from the other destination terminal, and a return path for returning the frame from the second memory means to the terminal if the frame is not returned from the lattice communication network within the predetermined time timed by the timer means. According to the communication control unit of the present invention, the frame can be transferred immediately to the terminal even if the predetermined time is timed by the timer means during the transmission with respect to the lattice communication network.

Still another object of the present invention is to provide a communication control unit for providing an interface between a node apparatus of a lattice communication network and a terminal in conformance with a token ring network standard, comprising detector means for detecting a carrier signal from the terminal, memory means for temporarily storing a frame which is to be transmitted from the lattice communication network to the terminal and for transmitting the stored frame to the terminal, control means, coupled to the memory means, for controlling an operation timing of the memory means, and a return path for returning the frame from the memory means to the lattice communication network if the frame is received from the lattice communication network in a state where the detector means detects no carrier signal. According to the communication control unit of the present invention, the state of the destination terminal can be detected with a quick response without the use of a timer means, and the efficiency of the communication network is improved.

A further object of the present invention is to provide a communication control unit for providing an interface between a node apparatus of a lattice communication network and a terminal in conformance with a token ring network standard, comprising address comparator means, having a physical address of the terminal, for detecting whether or not a destination address of an input frame from the lattice communication network matches a terminal address of the terminal so as to detect whether or not a destination of the input frame is the terminal, and input limiting means for neglecting an input of other frames from the lattice communication network until the input frame is input from the terminal as a returned frame from the terminal and output again to the lattice communication network when the address comparator means detects the match of the two compared addresses. According to the communication control unit of the present invention, it is possible to avoid disappearances of the frame due to collision because the input of the other frames from the lattice communication network is neglected.

Another object of the present invention is to provide a communication control unit for providing an interface between a node apparatus of a lattice communication network and a terminal in conformance with a token ring network standard, comprising address comparator means ,having a physical address of the terminal, for detecting whether or not a destination address of an input frame from the lattice communication network matches a terminal address of the terminal so as to detect whether or not a destination of the input frame is the terminal, and answer signal transmitting means for transmitting an answer signal to the lattice communication network immediately after the address comparator means detects the match of the two compared addresses. According to the communication control unit of the present invention, it is possible to positively fix the path, and the broadcast time in the lattice communication network can be reduced, thereby improving the communication efficiency.

Other objects and further features of the present invention will be apparent from the following detailed description when read in conjunction with the accompanying drawings.

DESCRIPTION OF THE PREFERRED EMBODIMENTS

Figure 1:
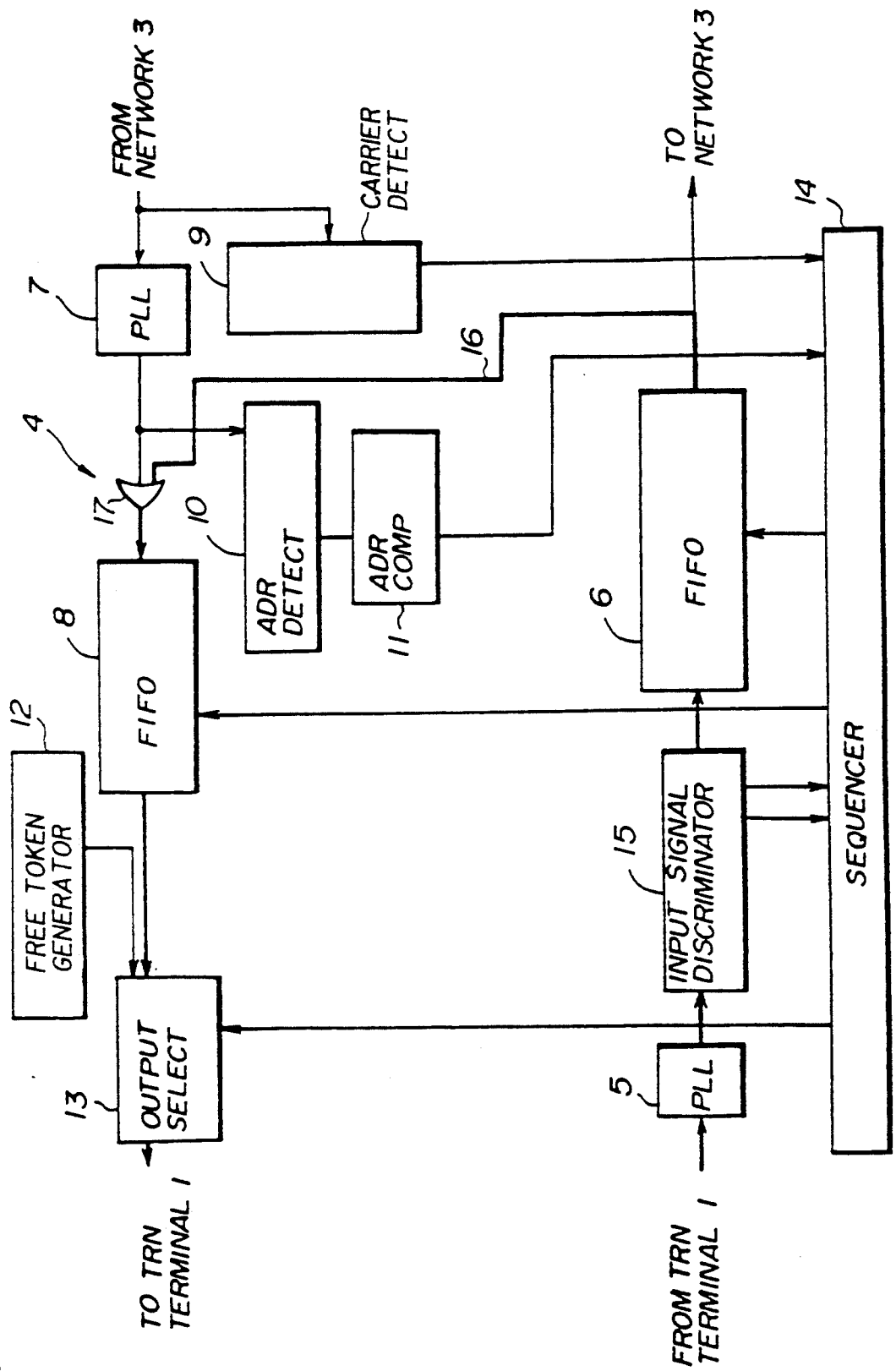
FIG. 1 is a system block diagram showing a first embodiment of a communication control unit according to the present invention.
Figure 2:
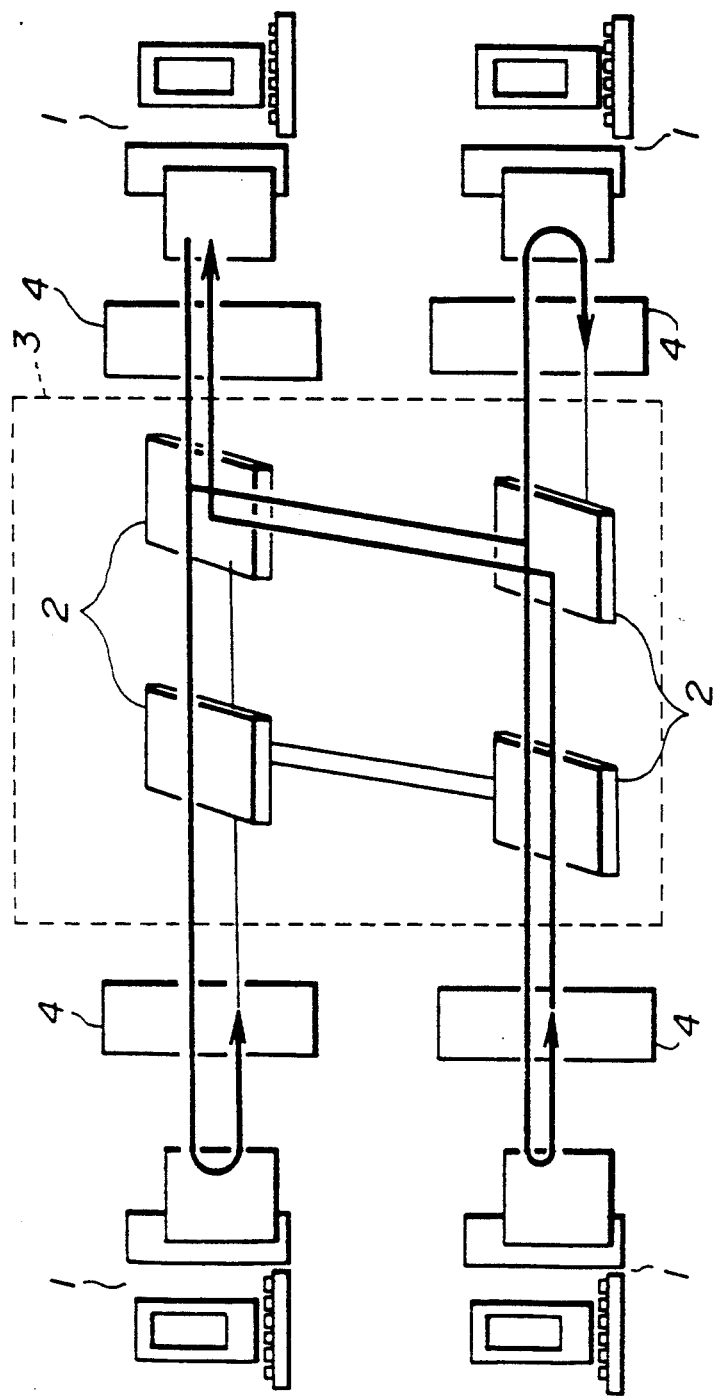
FIG. 2 is a diagram for explaining a basic connection of a token ring network and a lattice communication network for explaining the first embodiment.

A description will be given of a first embodiment of a communication control unit according to the present invention, by referring to FIGS. 1 and 2. FIG. 1 shows the first embodiment, and FIG. 2 shows a basic connection of a token ring network and a lattice communication network for explaining the first embodiment. In FIG. 2, a plurality of token ring network (TRN) terminals 1 of the TRN standard are coupled to a lattice communication network 3 which has a plurality of nodes 2 via TRN adaptive units (TAUs) 4. The TAU 4 is used as an interface.

Each TAU 4 shown in FIG. 2 has a structure shown in FIG. 1 including a phase locked loop (PLL) circuit 5, a first-in-first-out (FIFO) 6, a PLL circuit 7, a FIFO 8, a carrier detector 9, an address detector 10, an address comparator 11, a free token generator 12, an output selector 13, a sequencer 14, an input signal discriminator 15, and an OR gate 17 which are connected as shown.

The PLL circuit 5 synchronizes the bits of an input signal from the TRN terminal 1. The FIFO 6 is used as a first memory for temporarily storing an input frame, that is, an output signal of the PLL circuit 5. The input frame is output from the FIFO 6 to the lattice communication network 3. On the other hand, the PLL circuit 7 synchronizes the bits of an input signal from the lattice communication network 3. The FIFO 8 is used as a second memory for temporarily storing an input frame, that is, an output signal of the PLL circuit 7. The input frame is output from the FIFO 8 to the TRN terminal 1.

The input signal from the lattice communication network 3 is input to the carrier detector 9 for detecting the input of the TRN signal, and the output signal of the PLL circuit 7 is successively input to the address detector 10 and the address comparator 11. The free token generator 12 is provided on the output side of the FIFO 8, and the output selector 13 selectively supplies the output of the FIFO 8 or the free token generator 12 to the TRN terminal 1. The sequencer 14 controls each part of the TAU 4.

In this embodiment, the input signal discriminator 15 for discriminating the MAC frame from the input frame from the TRN terminal 1 is provided on the output side of the PLL circuit 5. The input signal discriminator 15 discriminates the free token and the frame, and also discriminates the MAC frame from the frame. When the MAC frame is detected by the input signal discriminator 15, a return path 16 indicated by a bold line for returning to the TRN terminal 1 via the FIFOs 6 and 8 is formed independently of the normal path with respect to the lattice communication network 3. For this reason, the OR gate 17 is provided on the input side of the FIFO 8 and is used in common with the PLL circuit 7.

After the bits of the input signal from the lattice communication network 3 are synchronized by the PLL circuit 7, the input signal is temporarily stored in the FIFO 8. At the same time, the address detector 10 and the address comparator 11 compare the address of its own TRN terminal 1 with the destination address of the input frame. When the compared addresses match, the input frame is read out from the FIFO 8 and is output to the TRN terminal 1 via the output selector 13.

On the other hand, the input signal from the TRN terminal 1 is supplied to the input signal discriminator 15 wherein the free token and the MAC frame are discriminated. The frame is written into the FIFO 6, but the MAC frame is distinguished from other frames and written. The other frames are output to the lattice communication network 3 in the normal manner. The MAC frame which is written in the FIFO 6 is read out immediately and is temporarily stored in the FIFO 8, again distinguished from other frames. Although FIG. 1 shows a simplified structure using the OR gate 17, when writing the MAC frame into the FIFO 8, the MAC frame is written into the FIFO 8 with a priority over the input frame from the lattice communication network 3. Accordingly, the MAC frame is read out from the FIFO 8 and is returned to the TRN terminal 1 via the output selector 13, and will not be output to the lattice communication network 3. Therefore, it is possible to prevent the frame from disappearing due to a collision which may occur if the MAC frame is transmitted to the lattice communication network 3, and the ring management of the TRN can be made in a normal manner.

Figure 3:
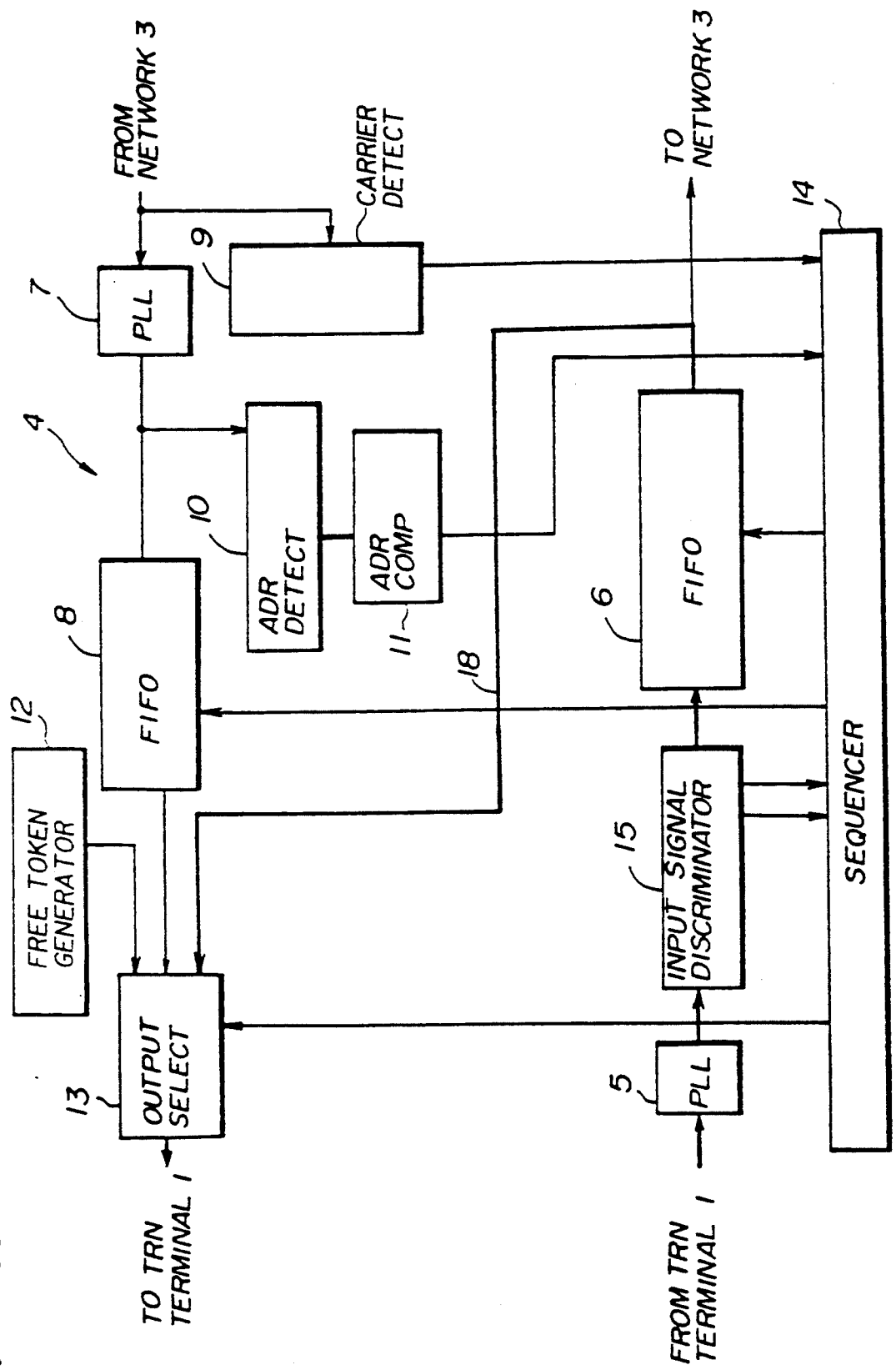
FIG. 3 is a system block diagram showing a second embodiment of the communication control unit according to the present invention.

Next, a description will be given of a second embodiment of the communication control unit according to the present invention, by referring to FIG. 3. In FIG. 3, those parts which are the same as those corresponding parts in FIG. 1 are designated by the same reference numerals, and a description thereof will be omitted.

In this embodiment, a return path 18 is formed when the MAC frame is detected by the input signal discriminator 15. This return path 18 does not pass through the FIFO 8, but returns to the TRN terminal 1 via the FIFO 6 and the selection made by the output selector 13.

Figure 4:
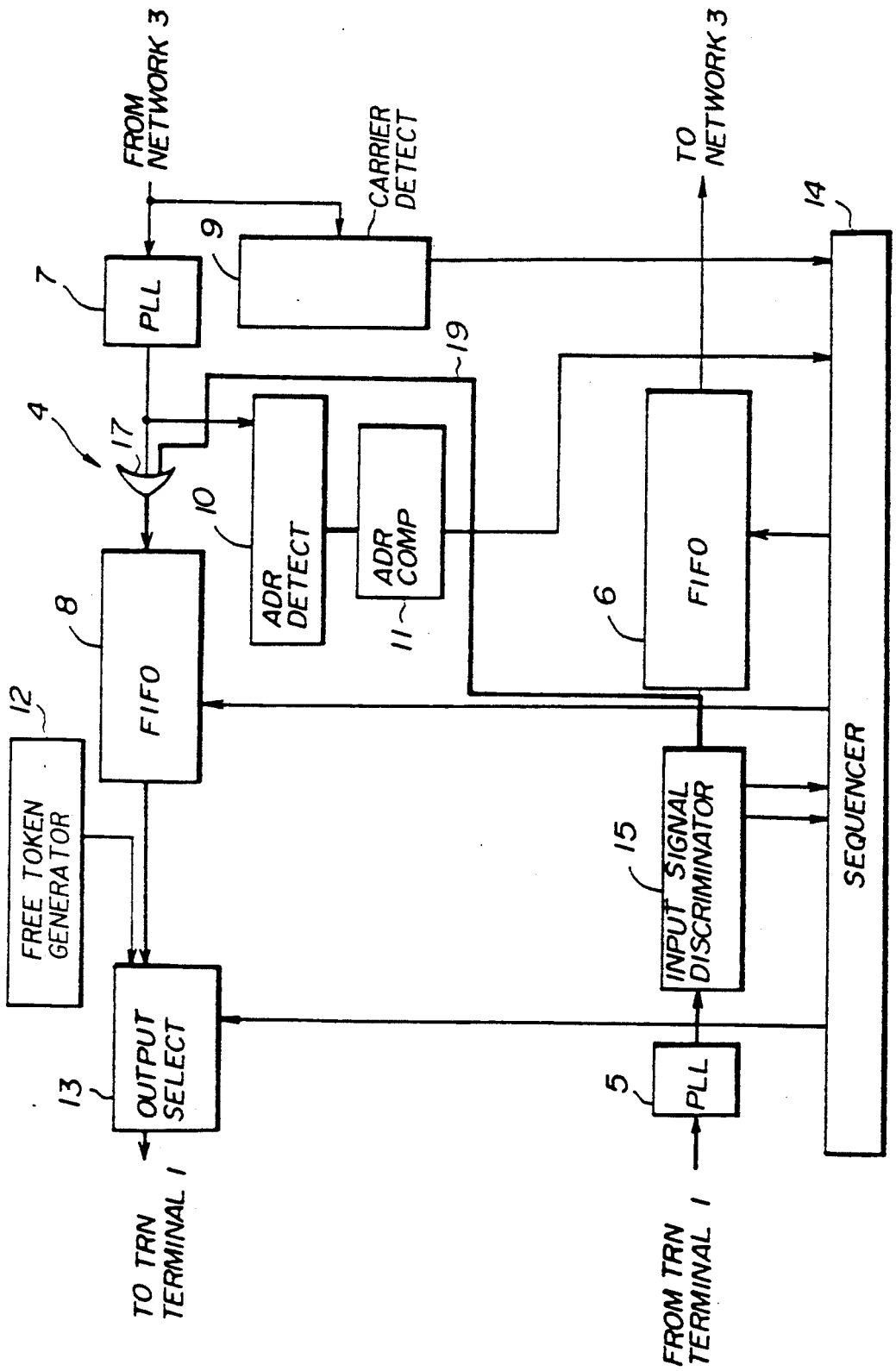
FIG. 4 is a system block diagram showing a third embodiment of the communication control unit according to the present invention.

Next, a description will be given of a third embodiment of the communication control unit according to the present invention, by referring to FIG. 4. In FIG. 4, those parts which are the same as those corresponding parts in FIG. 1 are designated by the same reference numerals, and a description thereof will be omitted.

In this embodiment, a return path 19 is formed when the MAC frame is detected by the input signal discriminator 15. This return path 19 does not pass through the FIFO 6, but returns to the TRN terminal 1 via the FIFO 8.

Figure 5:
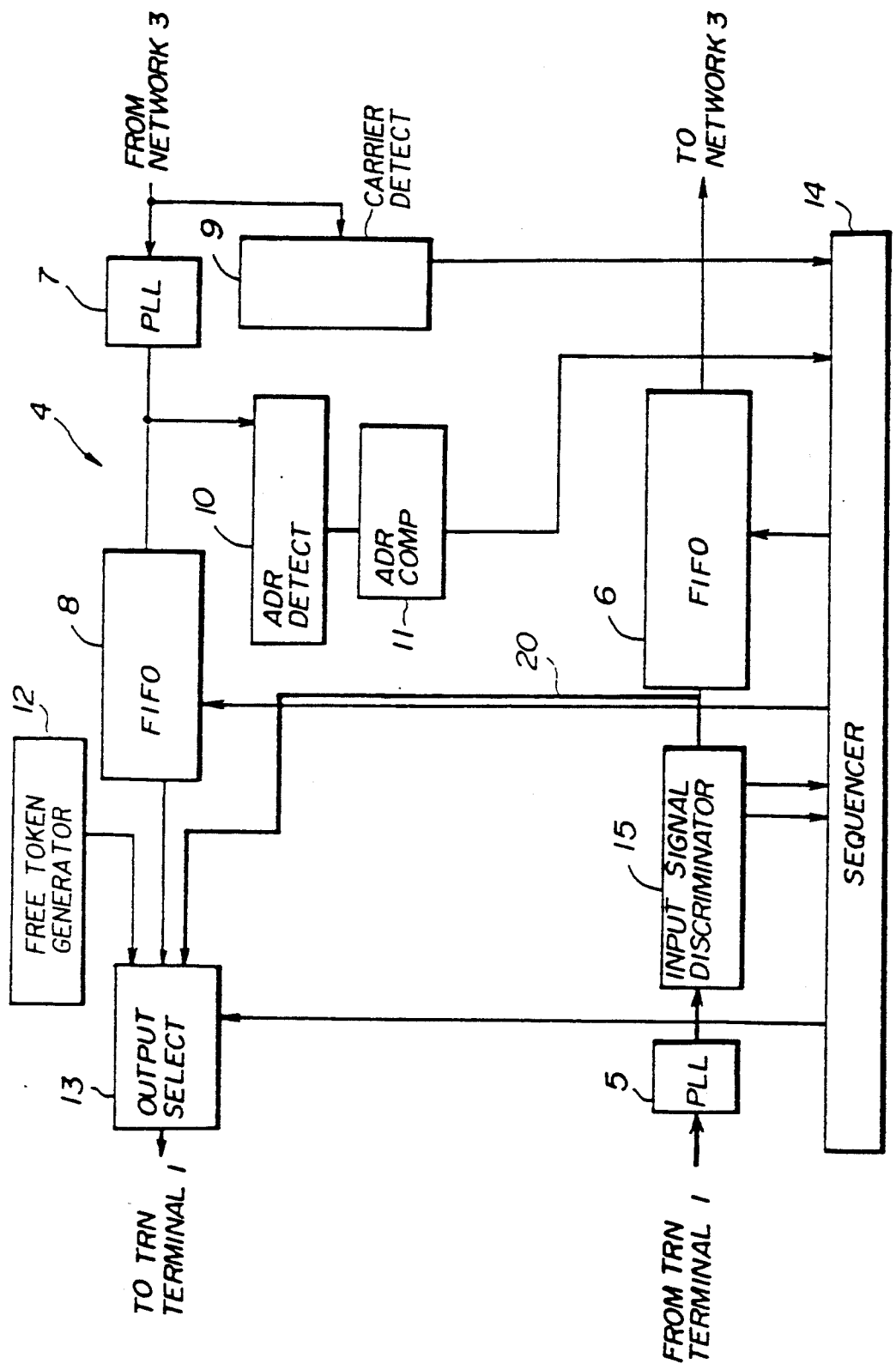
FIG. 5 is a system block diagram showing a fourth embodiment of the communication control unit according to the present invention.

Next, a description will be given of a fourth embodiment of the communication control unit according to the present invention, by referring to FIG. 5. In FIG. 5, those parts which are the same as those corresponding parts in FIG. 1 are designated by the same reference numerals, and a description thereof will be omitted.

In this embodiment, a return path 20 is formed when the MAC frame is detected by the input signal discriminator 15. This return path 20 does not pass through the FIFOs 6 and 8, but returns to the TRN terminal from the input signal discriminator 1 by the selection made by the output selector 13.

Figure 6:
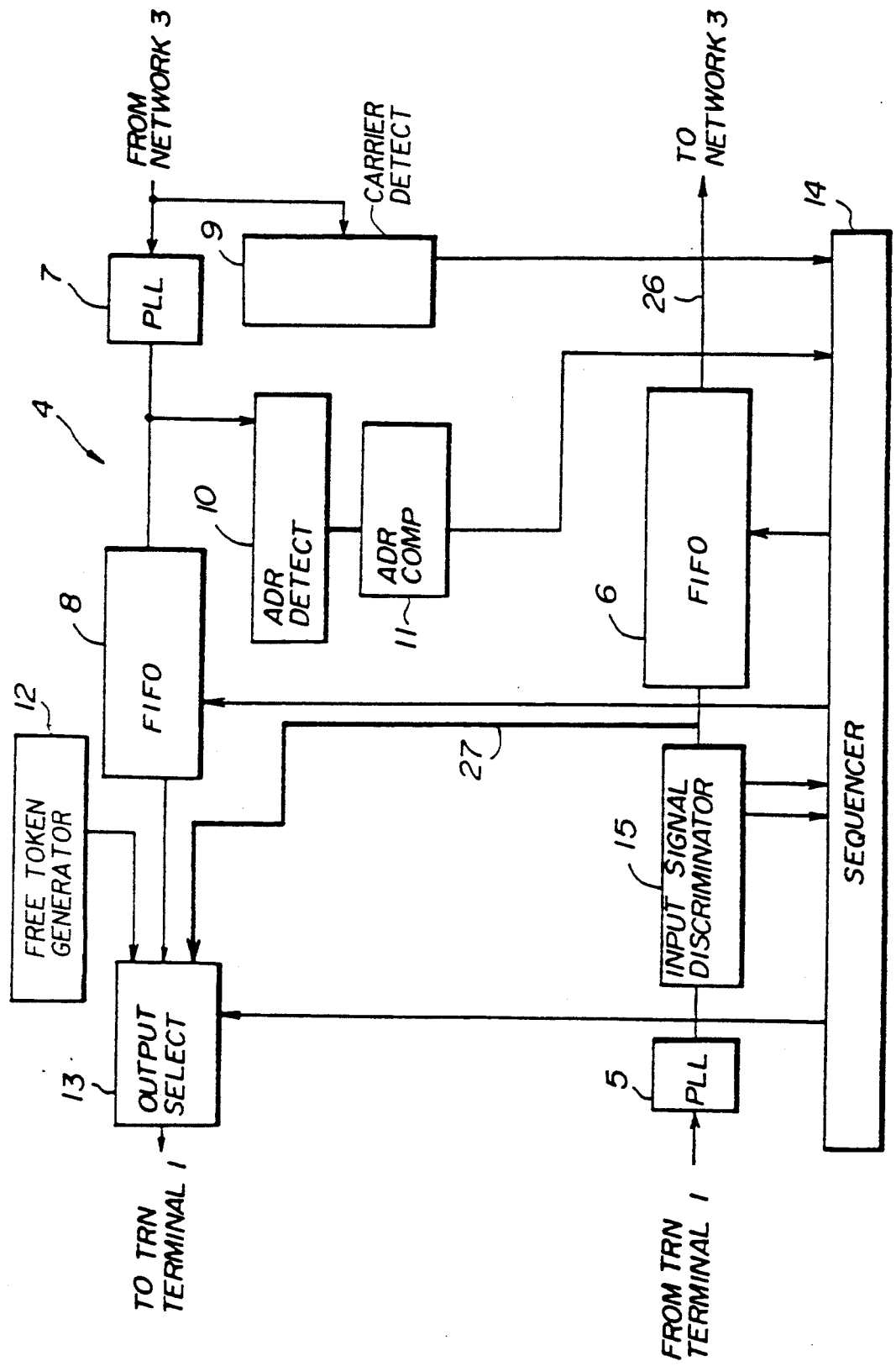
FIG. 6 is a system block diagram showing a fifth embodiment of the communication control unit according to the present invention.

Next, a description will be given of a fifth embodiment of the communication control unit according to the present invention, by referring to FIG. 6. In FIG. 6, those parts which are the same as those corresponding parts in FIG. 1 are designated by the same reference numerals, and a description thereof will be omitted.

In this embodiment, the input signal discriminator 15 discriminates the broadcast frame (broadcast signal) from the input frame from the TRN terminal 1. The input signal discriminator 15 discriminates the free token and the frame, and also discriminates the broadcast frame from the frame. When the broadcast frame is detected by the input signal discriminator 15, a return path 27 indicated by a bold line for returning directly to the TRN terminal 1 from the input signal discriminator 15 via the output selector 1 is formed independently of a normal path 26 with respect to the lattice communication network 3.

After the bits of the input signal from the lattice communication network 3 are synchronized by the PLL circuit 7, the input signal is temporarily stored in the FIFO 8. At the same time, the address detector 10 and the address comparator 11 compare the address of its own TRN terminal 1 with the destination address of the input frame. When the compared addresses match, the input frame is read out from the FIFO 8 and is output to the TRN terminal 1 via the output selector 13 under the control of the sequencer 14 which controls the operation timing.

On the other hand, the input signal from the TRN terminal 1, after being subjected to the bit synchronization in the PLL circuit 5, is supplied to the input signal discriminator 15 wherein the address of the input frame is detected and the free token and the broadcast frame are discriminated. The input frame is written into the FIFO 6 and is output to the lattice communication network 3 under the timing control of the sequencer 14.

If the frame input from the TRN terminal 1 is the broadcast frame, the sequencer 14 controls the input signal discriminator 15 and transmits the broadcast frame to the lattice communication network 3 via the output path 26. At the same time, the output selector 13 is controlled and the broadcast signal is transmitted immediately to the TRN terminal 1 via the return path 27. Accordingly, when the broadcast frame is input, the broadcast frame will not be treated as an abnormal signal by the TRN terminal 1 which is connected to the TAU 4, and a positive interface is realized. Since the broadcast frame is returned without passing through the FIFOs 6 and 8, the control of the FIFOs 6 and 8 becomes simple, and the broadcast frame can be transmitted immediately to the TRN terminal 1.

If the broadcast frame is input from another TRN terminal (that is, via the lattice communication network 3), the broadcast frame is transmitted to the TRN terminal 1 which is connected to the TAU 4 via the FIFO 8, and the retransmission of this broadcast frame from the TRN terminal 1 is waited. When the input signal discriminator 15 detects this broadcast frame, the sequencer 14 stops this broadcast frame from being transmitted to the lattice communication network 3.

Figure 7:
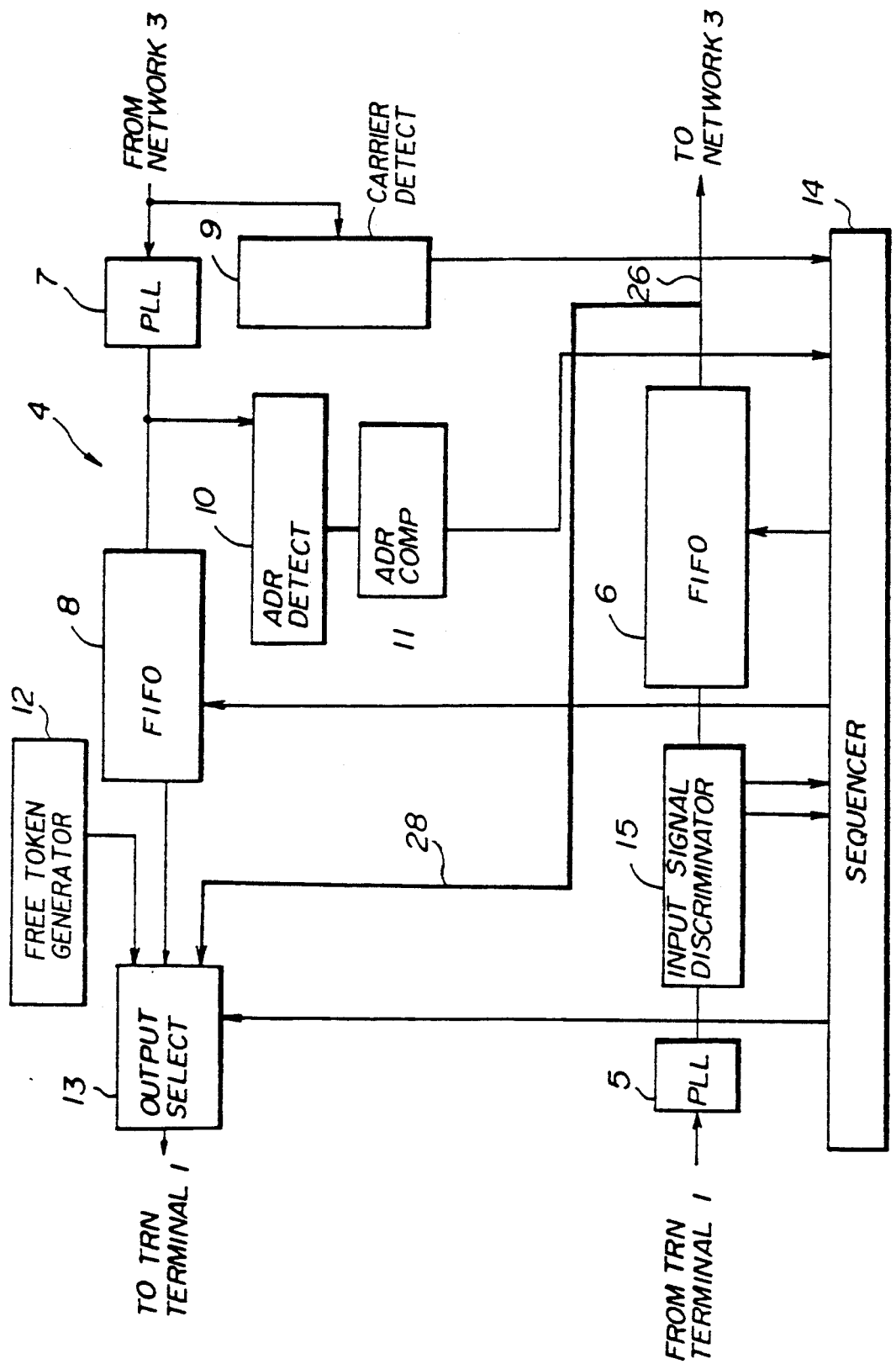
FIG. 7 is a system block diagram showing a sixth embodiment of the communication control unit according to the present invention.

Next, a description will be given of a sixth embodiment of the communication control unit according to the present invention, by referring to FIG. 7. In FIG. 7, those parts which are the same as those corresponding parts in FIG. 6 are designated by the same reference numerals, and a description thereof will be omitted.

In this embodiment, a return path 28 is used when the broadcast frame is detected by the input signal discriminator 15, and the broadcast frame is returned to the TRN terminal 1 by the selection of the output selector 13. The return path 28 does not pass through the FIFO 8 but passes through the FIFO 6. The operation of this embodiment is basically the same as that of the fifth embodiment described above. However, since the return path 28 passes through the FIFO 6 and the path is common as the output path 26 up to the FIFO 6, the broadcast frame can be transmitted to the TRN terminal 1 with the timing with which the frame is transmitted to the lattice communication network 3.

Figure 8:
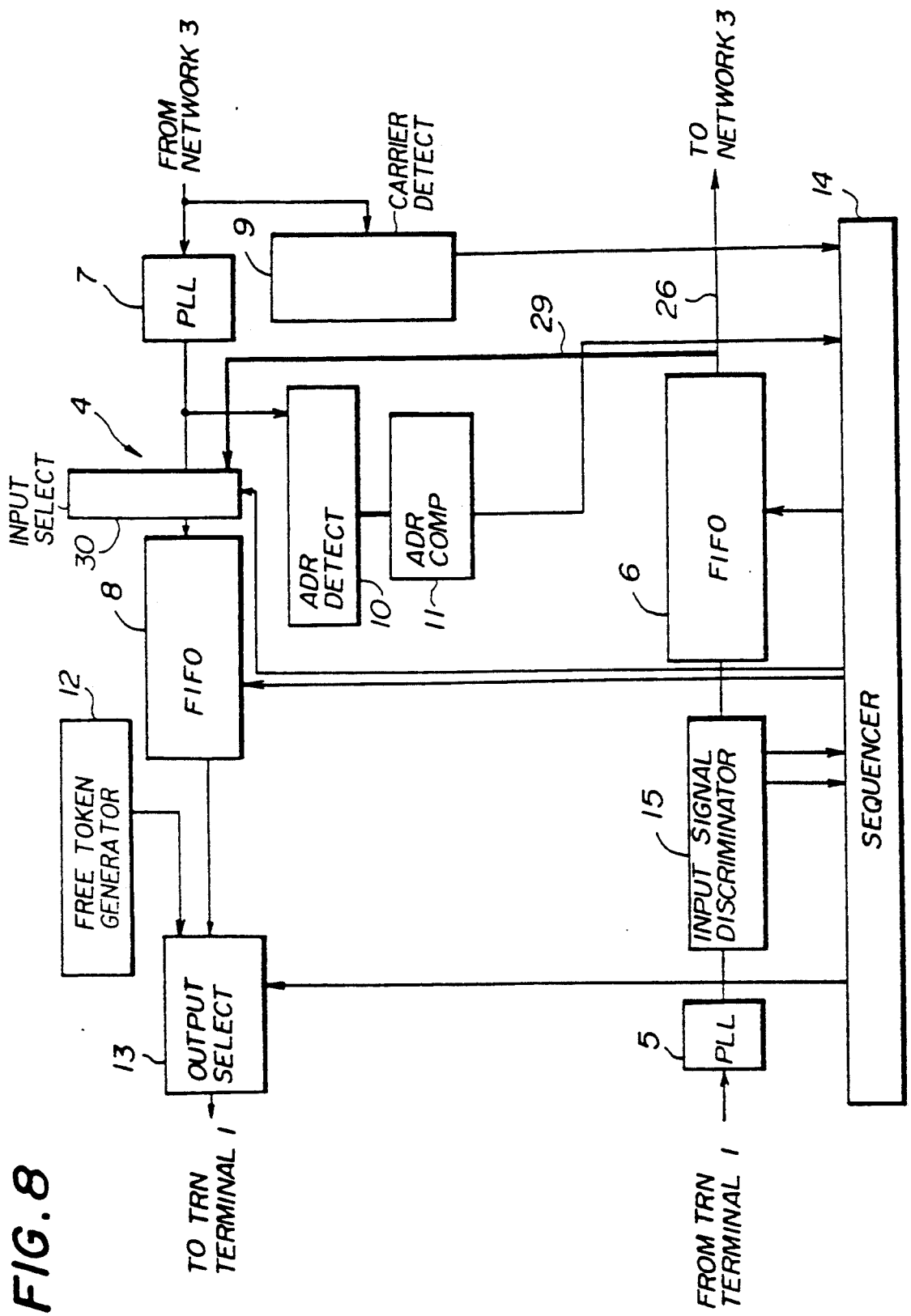
FIG. 8 is a system block diagram showing a seventh embodiment of the communication control unit according to the present invention.

Next, a description will be given of a seventh embodiment of the communication control unit according to the present invention, by referring to FIG. 8. In FIG. 8, those parts which are the same as those corresponding parts in FIG. 6 are designated by the same reference numerals, and a description thereof will be omitted.

In this embodiment, a return path 29 is used when the broadcast frame is detected by the input signal discriminator 15, and the broadcast frame is returned to the TRN terminal 1. The return path 29 passes through the FIFOs 6 and 8. For this reason, an input selector 30 is provided on the input side of the FIFO 8 in order to select the signal from the lattice communication network 3 and the broadcast frame. The operation of this embodiment is basically the same as that of the fifth embodiment described above. However, since the return path 29 also passes through the FIFO 8, the returning broadcast frame can be treated similarly as the normal frame from the lattice communication network 3, and the system design is facilitated.

Figure 9:
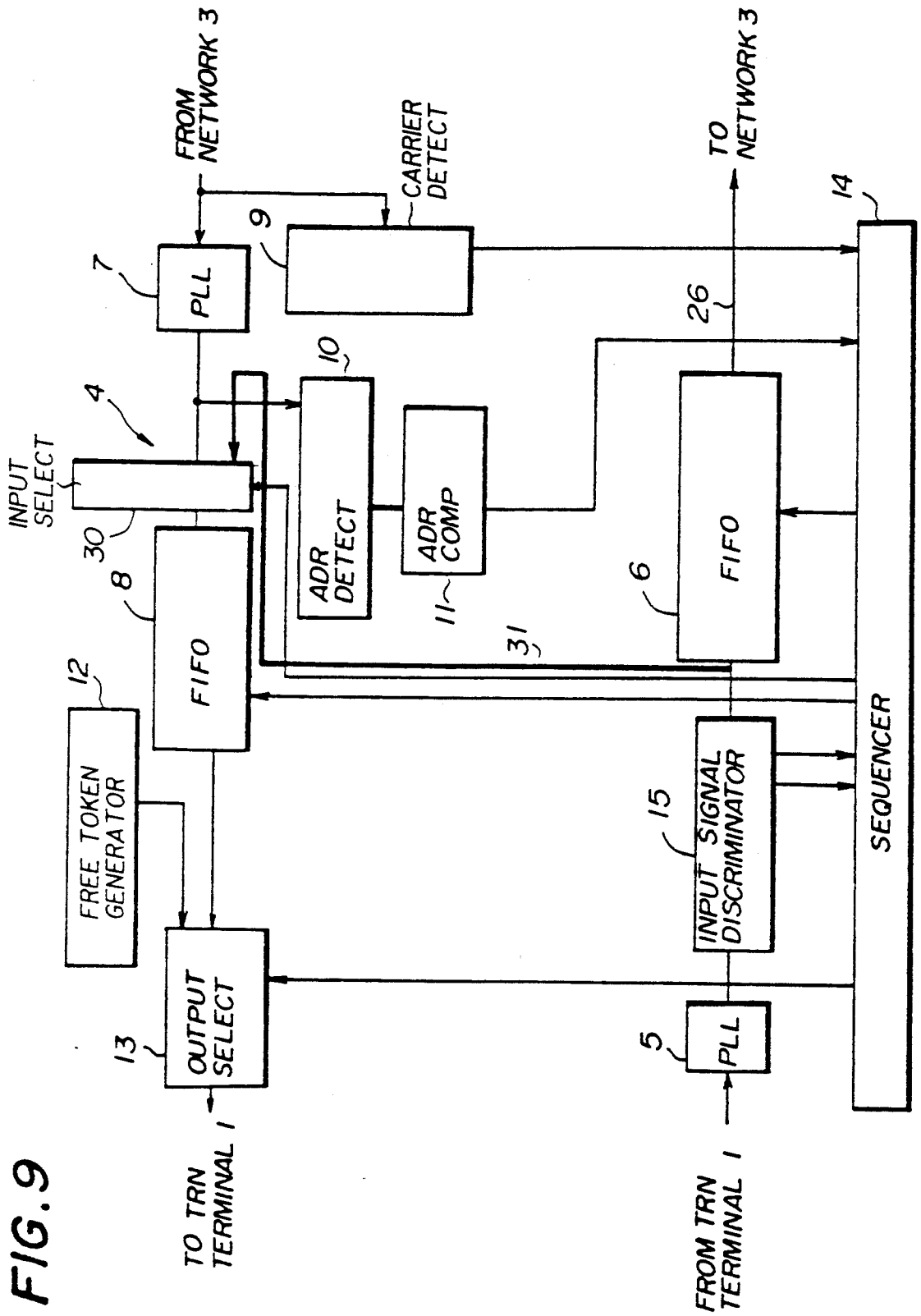
FIG. 9 is a system block diagram showing an eighth embodiment of the communication control unit according to the present invention.

Next, a description will be given of an eighth embodiment of the communication control unit according to the present invention, by referring to FIG. 9. In FIG. 9, those parts which are the same as those corresponding parts in FIG. 8 are designated by the same reference numerals, and a description thereof will be omitted.

In this embodiment, a return path 31 is used when the broadcast frame is detected by the input signal discriminator 15, and the broadcast frame is returned to the TRN terminal 1. The return path 31 passes through the FIFO 8 but not through the FIFO 6. The operation of this embodiment is basically the same as that of the fifth embodiment described above. However, since the return path 31 passes through the FIFO 8, the returning broadcast frame can be treated similarly as the normal frame from the lattice communication network 3, and the system design is facilitated. In addition, since the broadcast frame does not pass through the FIFO 6, the transmission to the lattice communication network 3 and the transmission to the TRN terminal 1 can be made independently of each other.

Figure 10:
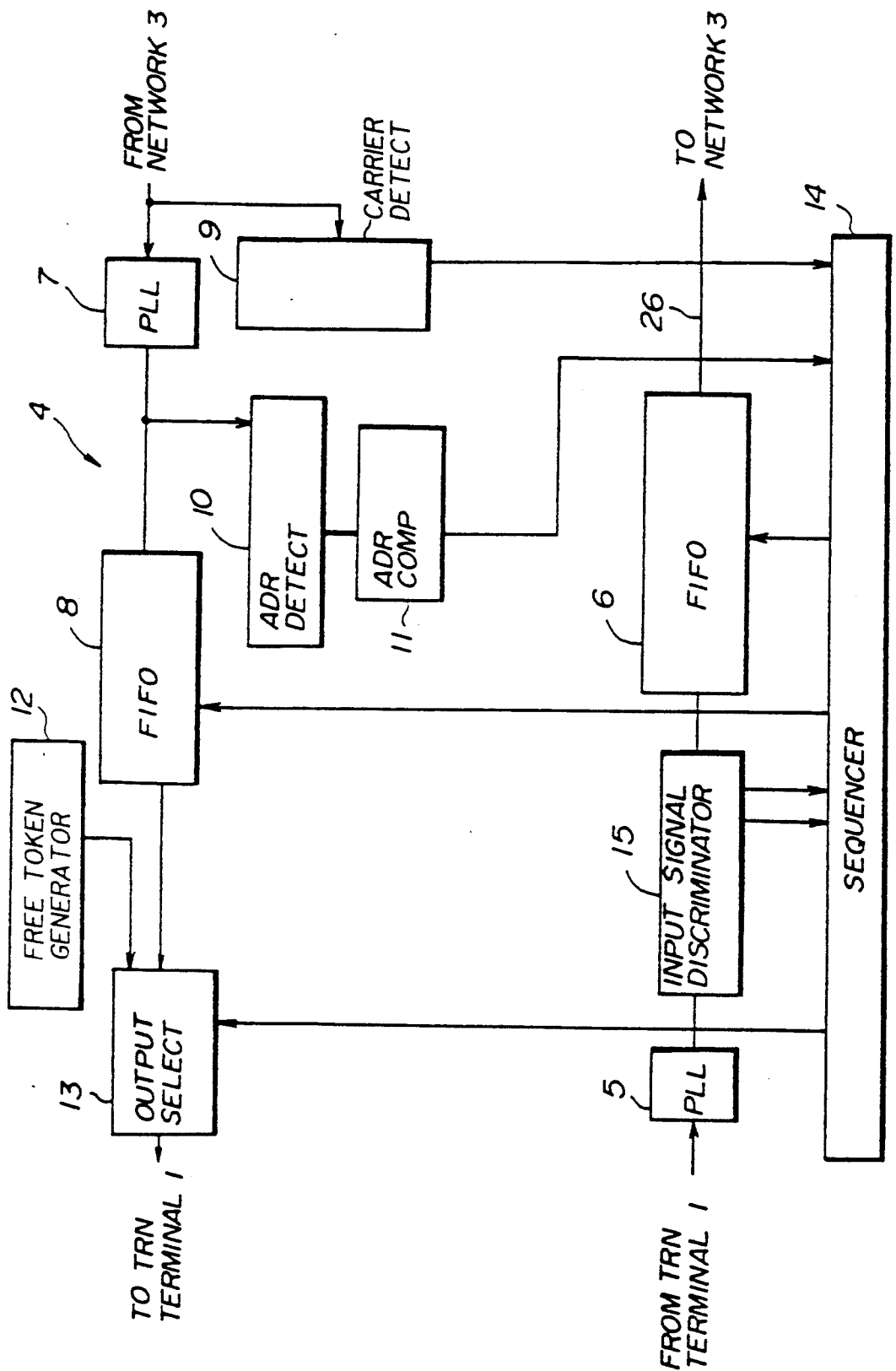
FIG. 10 is a system block diagram showing a ninth embodiment of the communication control unit according to the present invention.

Next, a description will be given of a ninth embodiment of the communication control unit according to the present invention, by referring to FIG. 10. In FIG. 10, those parts which are the same as those corresponding parts in FIG. 6 are designated by the same reference numerals, and a description thereof will be omitted.

In this embodiment, only the output path 26 is provided, and no return path to the TRN terminal 1 is used. When the input signal discriminator 15 detects that the broadcast frame is transmitted from the TRN terminal 1, the sequencer 14 controls the FIFO 6 to transmit the broadcast frame to the lattice communication network 3, and the return of the broadcast frame from another TRN terminal is waited. When the broadcast frame is returned from another TRN terminal, this broadcast frame passes through the FIFO 8 and is transmitted to the TRN terminal 1 which is connected to the TAU 4, and the retransmission of this broadcast frame from the TRN terminal 1 is waited. When the broadcast frame is detected by the input signal discriminator 15, the broadcast frame is transmitted to the lattice communication network 3 after a predetermined time elapses from the time when the receipt of the broadcast frame ends. Therefore, according to this embodiment, the all of the TAUs 4 which receive the broadcast frame transmit the broadcast frame, but in the lattice communication network, only one of the broadcast frames returns to the transmitting TRN terminal.

Figure 11:
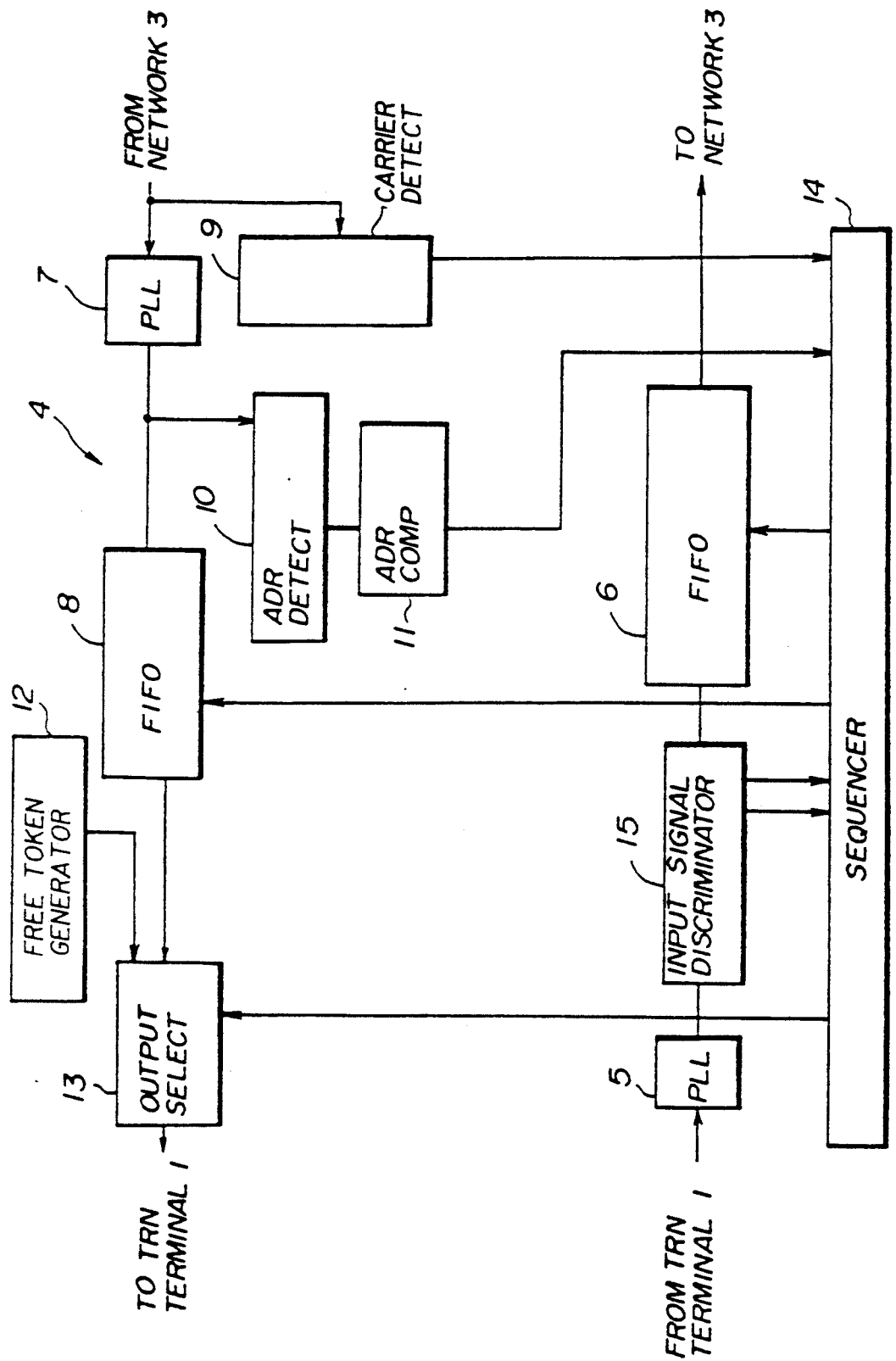
FIG. 11 is a system block diagram showing a tenth embodiment of the communication control unit according to the present invention.

Next, a description will be given of a tenth embodiment of the communication control unit according to the present invention, by referring to FIG. 11. In FIG. 11, those parts which are the same as those corresponding parts in FIG. 1 are designated by the same reference numerals, and a description thereof will be omitted.

In this embodiment, the PLL circuit 7 synchronizes the bits of an input signal from the lattice communication network 3, and the FIFO 8 temporarily stores an input frame, that is, an output signal of the PLL circuit 7. At the same time, the carrier detector 9 detects the input of the TRN signal as a carrier. The address detector 10 and the address comparator 12 compare the address of its own TRN terminal 1 with the destination address of the input frame. If the two compared addresses match, the input frame is read out from the FIFO 8 under the control of the sequencer 14, and the input frame is output to the TRN terminal 1 via the output selector 13. The output selector 13 selectively outputs the output frame and the free token. A clock signal which is reproduced in the PLL circuit 7 is used when making a write operation with respect to the FIFO 8, and a clock signal from an internal crystal oscillator (not shown) is used when making a read operation with respect to the FIFO 8.

On the other hand, the input frame from the TRN terminal 1 is supplied to the input signal discriminator 15 wherein the free token and the frame are discriminated. Only the input frame is written into the FIFO 6. A clock signal which is reproduced in the PLL circuit 5 is used when making this write operation with respect to the FIFO 6. After the write operation with respect to the FIFO 6 ends, a read operation is made with respect to the FIFO 6 using a clock signal from an internal crystal oscillator (not shown), and the read out frame is output to the lattice communication network 3.

Figure 12:
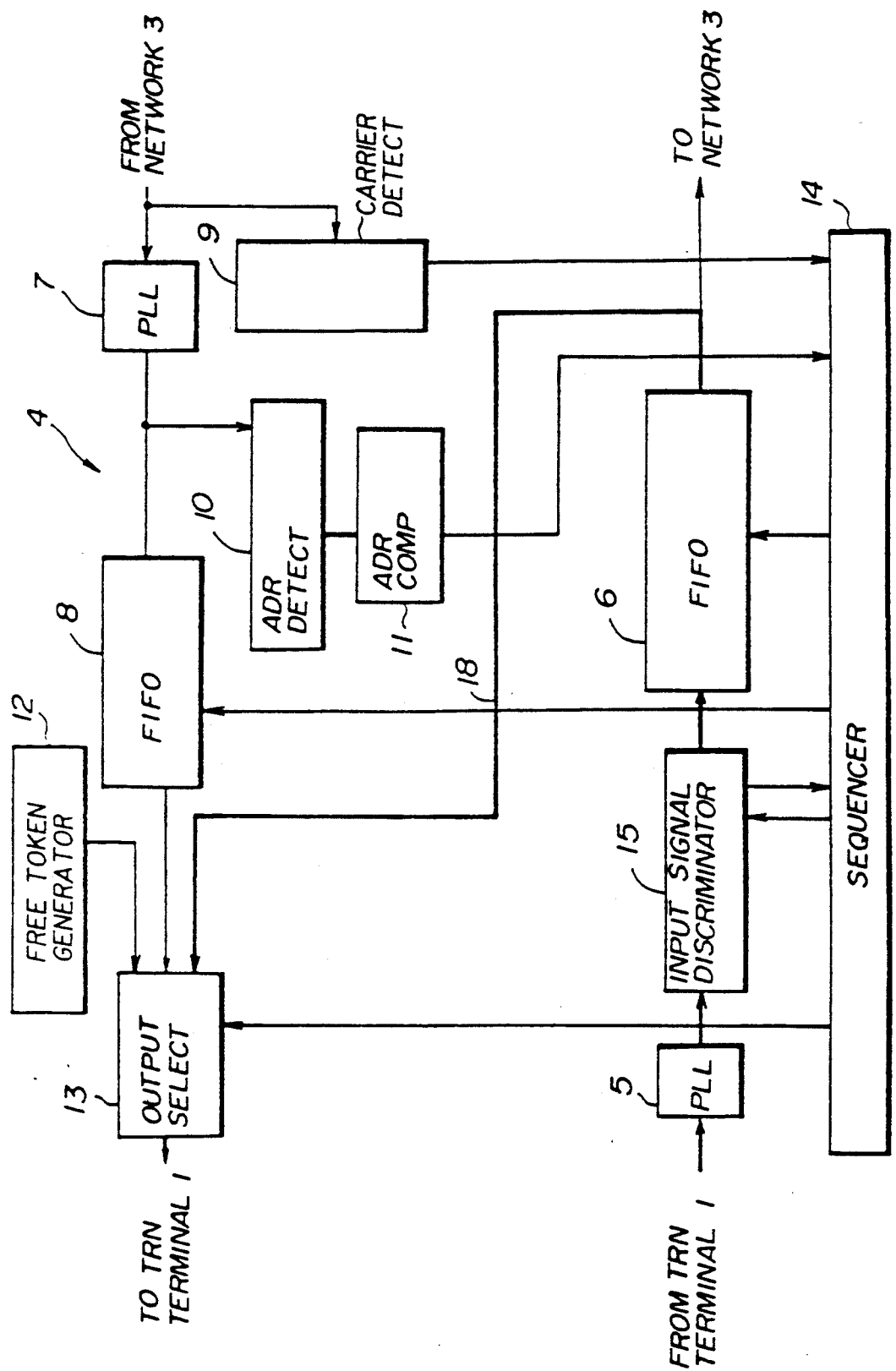
FIG. 12 is a system block diagram showing an eleventh embodiment of the communication control unit according to the present invention.

Next, a description will be given of an eleventh embodiment of the communication control unit according to the present invention, by referring to FIG. 12. In FIG. 12, those parts which are the same as those corresponding parts in FIG. 3 are designated by the same reference numerals, and a description thereof will b omitted.

In this embodiment, the return path 18 from the output selector 13 to the TRN terminal 1 passe through the FIFO 6 but not through the FIFO 8, as shown in FIG. 12. In addition, the capacity of the FIFO 8 is greater than or equal to the frame length of the active monitor existing MAC frame (AMP).

For the sake of convenience, it is assumed that the input frame is received from the lattice communication network 3 while returning the MAC frame to the TRN terminal 1. In this case, the return of the MAC frame has the higher priority. Hence, the input frame from the lattice communication network 3 is buffered in the FIFO 8 and is transmitted to the TRN terminal 1 in synchronism with the free token after the return of the MAC frame ends. In other words, because the input frame from the lattice communication network 3 is buffered in the FIFO 8 only during the return of the MAC frame, it is sufficient for the FIFO 8 to have the capacity greater than or equal to the frame length of the MAC frame.

Particularly, the MAC frame which is transmitted from the TRN terminal 1 in the normal state in which the communication is possible is only the active monitor existing MAC frame, and thus, it is sufficient for the FIFO 8 to have a capacity greater than or equal to the frame length of the active monitor existing MAC frame. Since the frame length of the active monitor existing MAC frame is 35 bytes, the FIFO 8 need only have a capacity of 2 kbit, for example, assuming that the storage takes place in the form of the differential Manchester code, even if the free token waiting time is considered.

Figure 13:
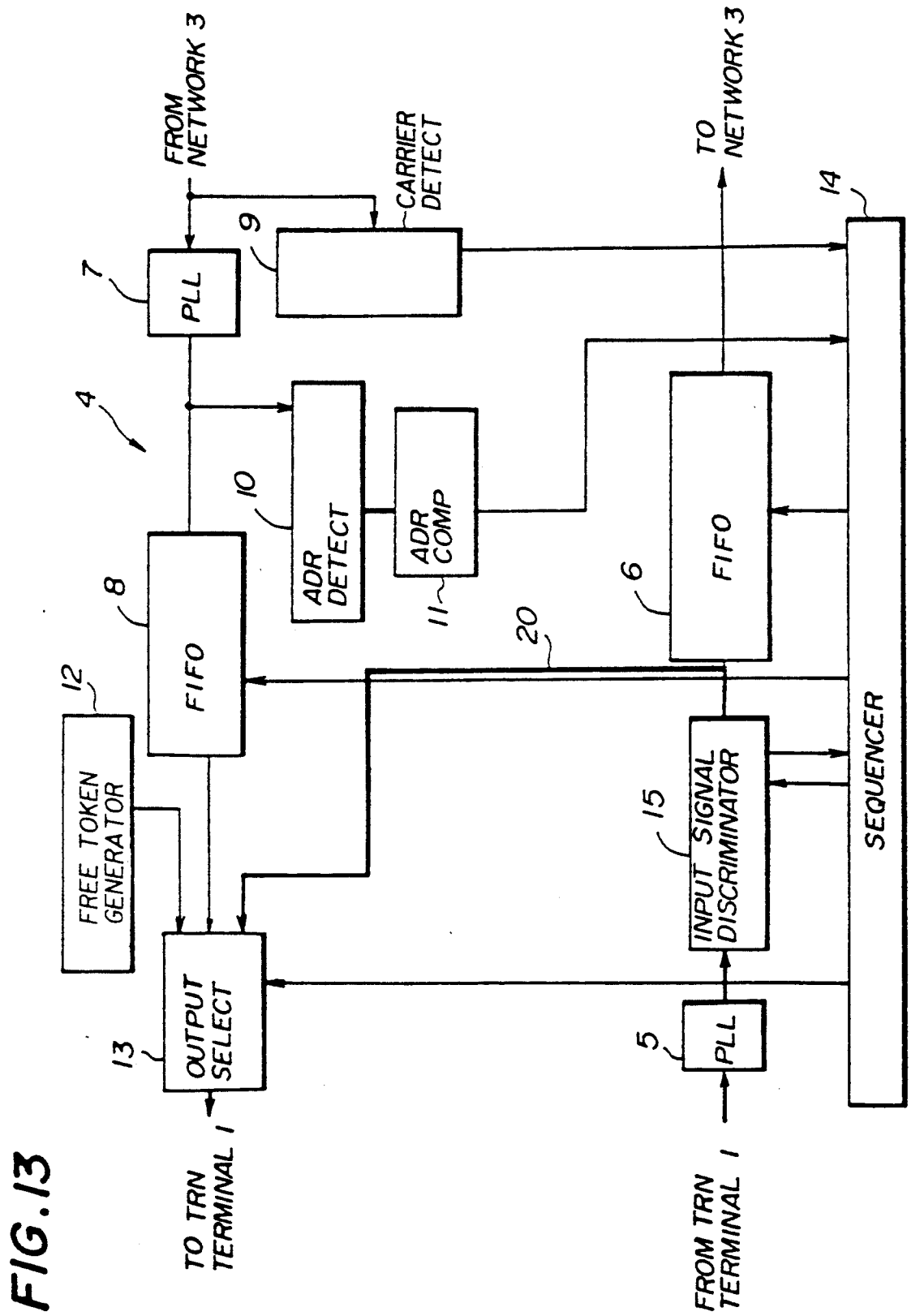
FIG. 13 is a system block diagram showing a twelfth embodiment of the communication control unit according to the present invention.

Next, a description will be given of a twelfth embodiment of the communication control unit according to the present invention, by referring to FIG. 13. In FIG. 13, those parts which are the same as those corresponding parts in FIG. 5 are designated by the same reference numerals, and a description thereof will be omitted.

In this embodiment, the return path 20 which is used when the MAC frame is detected by the input signal discriminator 15 does not pass through the FIFOs 6 and 8, and the MAC frame is returned to the TRN terminal 1 by the selection of the output selector 13. Otherwise, the operation of this embodiment is basically the same as that of the eleventh embodiment described above.

Figure 14:
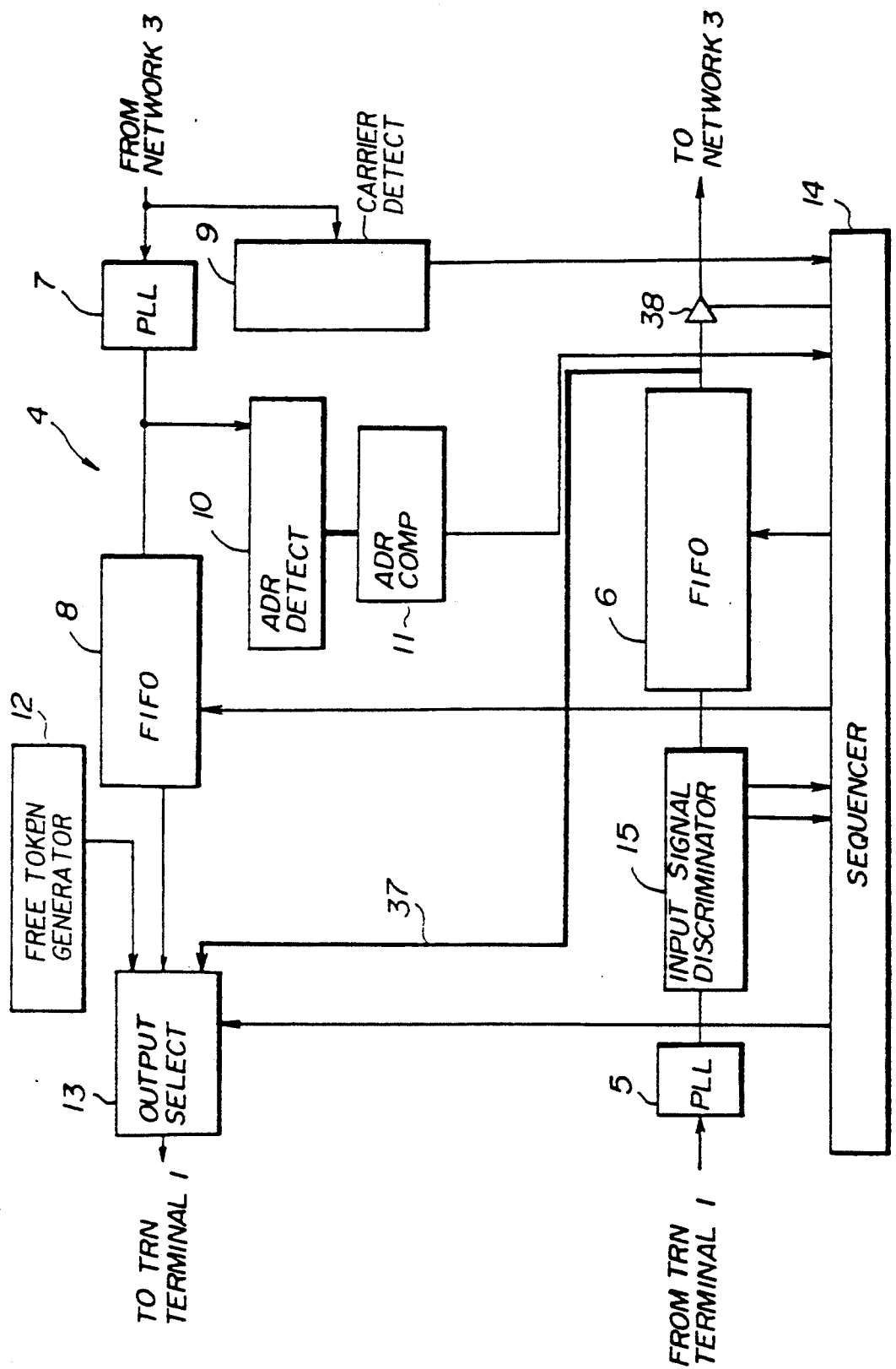
FIG. 14 is a system block diagram showing a thirteenth embodiment of the communication control unit according to the present invention.

Next, a description will be given of a thirteenth embodiment of the communication control unit according to the present invention, by referring to FIG. 14. In FIG. 14, those parts which are the same as those corresponding parts in FIG. 1 are designated by the same reference numerals, and a description thereof will be omitted.

In this embodiment, a buffer 38 is provided on the output side of the FIFO 6. In addition, the input signal discriminator 15 detects the address of the input frame, and discriminates whether the input is the free token or the broadcast frame. The sequencer 14 which controls each part of the TAU 4 has a built-in timer (not shown). A return path 37 is provided to return the signal from the output side of the FIFO 6 to the TRN terminal 1 via the output selector 13.

After the bits of the input signal from the TRN terminal 1 are synchronized by the PLL circuit 5, the input signal is supplied to the input signal discriminator 15 wherein the address of the input frame is detected and the free token and the broadcast frame are discriminated. The input frame is written into the FIFO 6 and is output to the lattice communication network 3 under the timing control of the sequencer 14. On the other hand, the signal from the lattice communication network 3 is subjected to the bit synchronization in the PLL circuit 7 and is temporarily stored in the FIFO 8. At the same time, after the carrier detection by the carrier detector 9, the address detector 10 and the address comparator 11 compare the address of its own TRN terminal 1 with the destination address of the input frame. If the two compared addresses match, the input frame is read out from the FIFO 8 and is output to the TRN terminal 1 via the output selector 13, under the timing control of the sequencer 14.

If the input frame from another TRN terminal is received from its own TRN terminal 1 and this input frame is to be transmitted to the lattice communication network 3 via the FIFO 6, the internal timer of the sequencer 14 starts to time a predetermined time. When this frame is returned to the TAU 4 via the lattice communication network 3 and the destination terminal, the address detector 10 detects that the returned frame is the frame transmitted from its own TRN terminal 1 (that is, transmitted from the transmitting terminal).

However, if the power source of the destination terminal or the power source of its TAU is OFF, the frame will not return to the transmitting terminal similarly as in the case where a failure is generated within the network. In this case, when the predetermined time is timed by the internal timer of the sequencer 14, the sequencer 14 controls the FIFO 6 and the output selector 13 to make the return path 37 valid, and the input frame stored in the FIFO 6 is returned to its own TRN terminal 1. As a result, the transmitting terminal, that is, the TRN terminal 1 of the TAU 4, can judge that the problem is caused by the destination terminal itself although the frame does not reach the destination terminal, and the cause of the problem will not be erroneously judged as being a failure in the cable or network.

Figure 15:
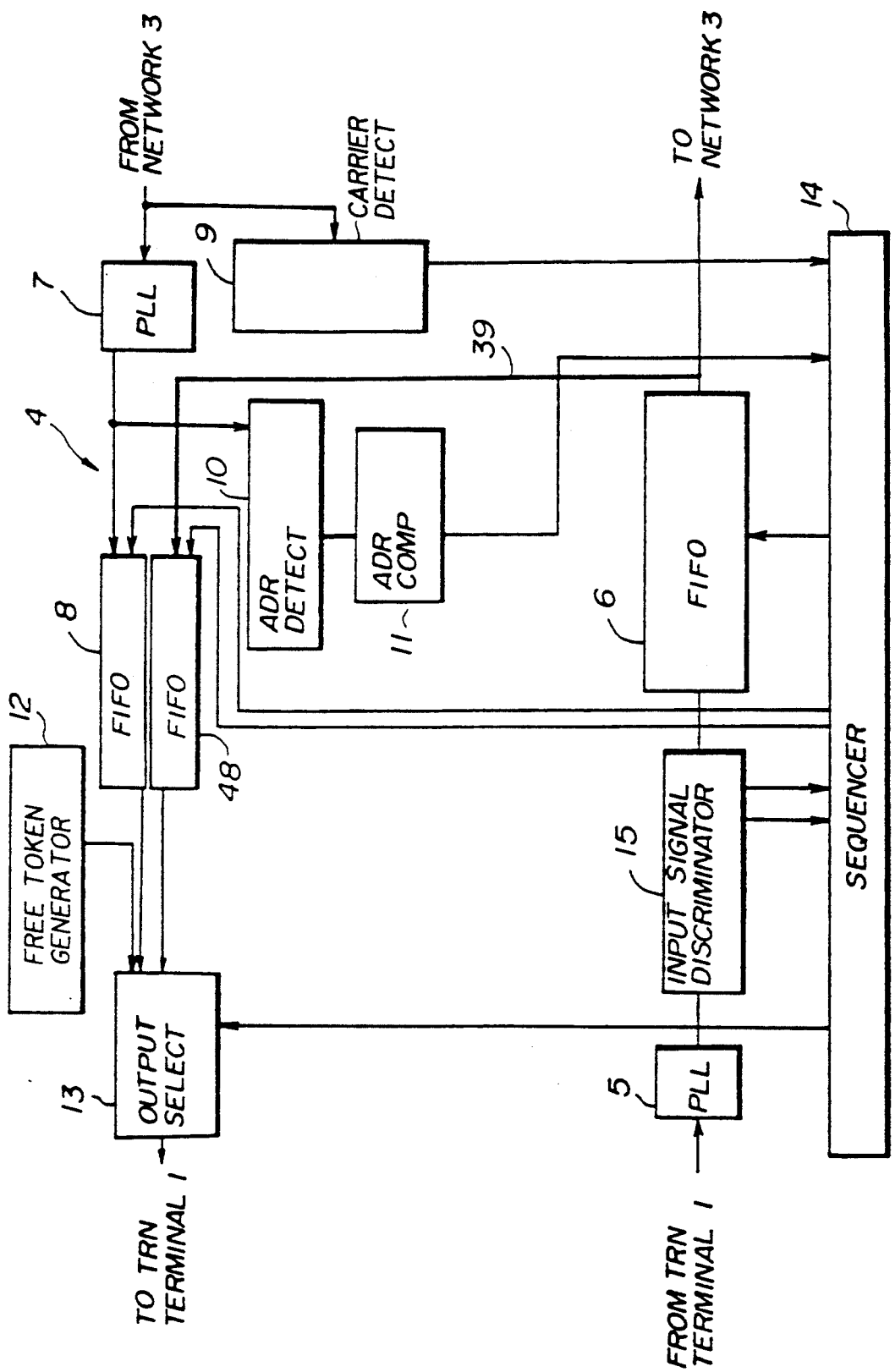
FIG. 15 is a system block diagram showing a fourteenth embodiment of the communication control unit according to the present invention.

Next, a description will be given of a fourteenth embodiment of the communication control unit according to the present invention, by referring to FIG. 15. In FIG. 15, those parts which are the same as those corresponding parts in FIG. 1 are designated by the same reference numerals, and a description thereof will be omitted.

In this embodiment, a FIFO 48 is provided in addition to the FIFO 8. The FIFO 48 is provided in a return path 39 from the FIFO 6 to the output selector 13, and the input frame with respect to the lattice communication network 3 is stored in the FIFO 48 when transmitting the input frame.

The operation of this embodiment is basically the same as that of the thirteenth embodiment described above. However, when the TRN terminal 1 of the TAU 4 receives the input frame which is intended for another terminal and is transmitted to the lattice communication network and the internal timer of the sequencer 14 starts, this input frame is stored in the FIFO 48. If an answer is received from the destination terminal in response to such an input frame, the input frame is normally returned to the transmitting terminal. On the other hand, if no answer is received within the predetermined time due to the power failure or the like at the destination terminal, the sequencer 13 controls the FIFO 48 and the output selector 13 so that the input frame stored in the FIFO 4 is returned to the transmitting terminal, that is, its own TRN terminal 1, and it is possible to detect that the input frame did not reach the destination terminal and also detect the cause of this situation.

Particularly because this embodiment uses the FIFO 48 exclusively for the return path 39, it is possible to immediately transmit the input frame from the FIFO 48 to its own TRN terminal 1 even if the predetermined time is timed by the internal timer of the sequencer 14 while the transmission is being made to the lattice communication network 3 via the FIFO 6.

Figure 16:
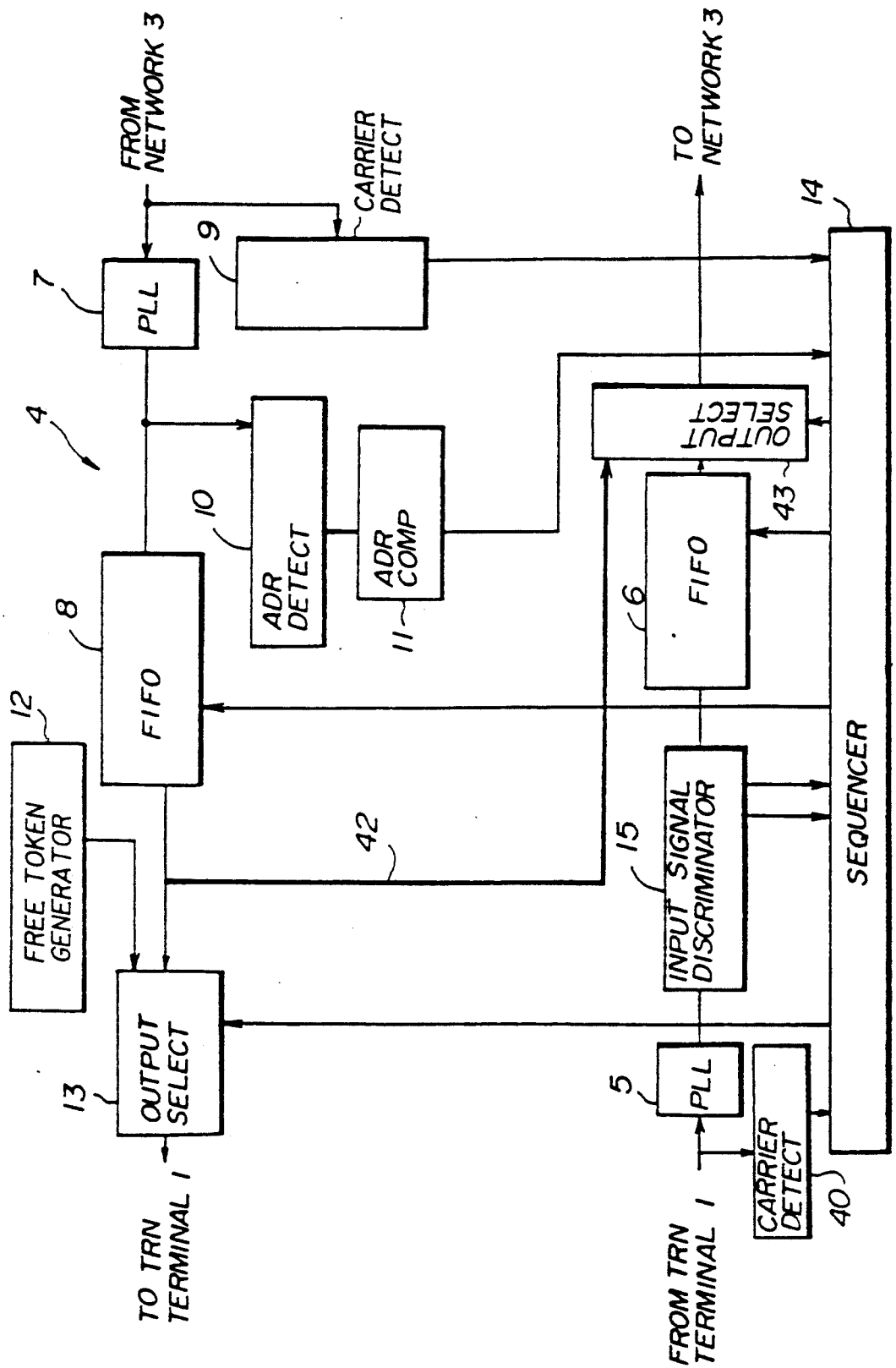
FIG. 16 is a system block diagram showing an fifteenth embodiment of the communication control unit according to the present invention.

Next, a description will be given of a fifteenth embodiment of the communication control unit according to the present invention, by referring to FIG. 16. In FIG. 16, those parts which are the same as those corresponding parts in FIG. 14 are designated by the same reference numerals, and a description thereof will be omitted.

In this embodiment, a modification is made in the TAU 4 which is used on the destination side. In other words, a carrier detector 40 which constantly detects whether or not a carrier exists, is provided on the input side relative to the TRN terminal 11. No carrier is detected by the carrier detector 40 if the power source of the terminal connected to the TAU 4 is OFF, and the carrier detector 40 in this case can regard the terminal as being disconnected from the network. The information output from the carrier detector 40 and indicative of whether or not the carrier exists, is input to the sequencer 14 which does not need an internal timer. In addition, a return path 42 is formed to return the input frame from the lattice communication network 3 which is received by the FIFO 8 to the lattice communication network 3 from the output side of the FIFO 8, and an output selector 43 selectively outputs the output of the FIFO 6 and the output of the FIFO 8.

Suppose that the power source of the TRN terminal 1 connected to this TAU 4 is OFF. In this case, the carrier detector 40 detects that there is no carrier, and a signal indicating the disconnection from the network is transmitted to the sequencer 14. In this state, the sequencer 14 controls the FIFO 8, the output selectors 13 and 43 and the like, so that the transmission path of the input frame from the lattice communication network 3 is switched from the normal path with respect to the terminal to the return path 42. As a result, when the input frame intended for this terminal is received from the transmitting terminal via the lattice communication network 3, the frame intended therefor is confirmed by the address detector 11, and the input frame stored in the FIFO 8 is transmitted again to the lattice communication network 3 via the return path 42 and is not transmitted to the destination terminal. Accordingly, this frame returns as it is to the transmitting terminal via the lattice communication network 3, and the transmitting terminal can judge that the disconnection from the network is caused by the power failure or the like at the destination terminal. Hence, according to this embodiment, no internal timer is required in the sequencer 14, and the transmitting terminal can quickly detect the situation at the destination terminal such as a power failure, thereby improving the network efficiency.

Figure 17:
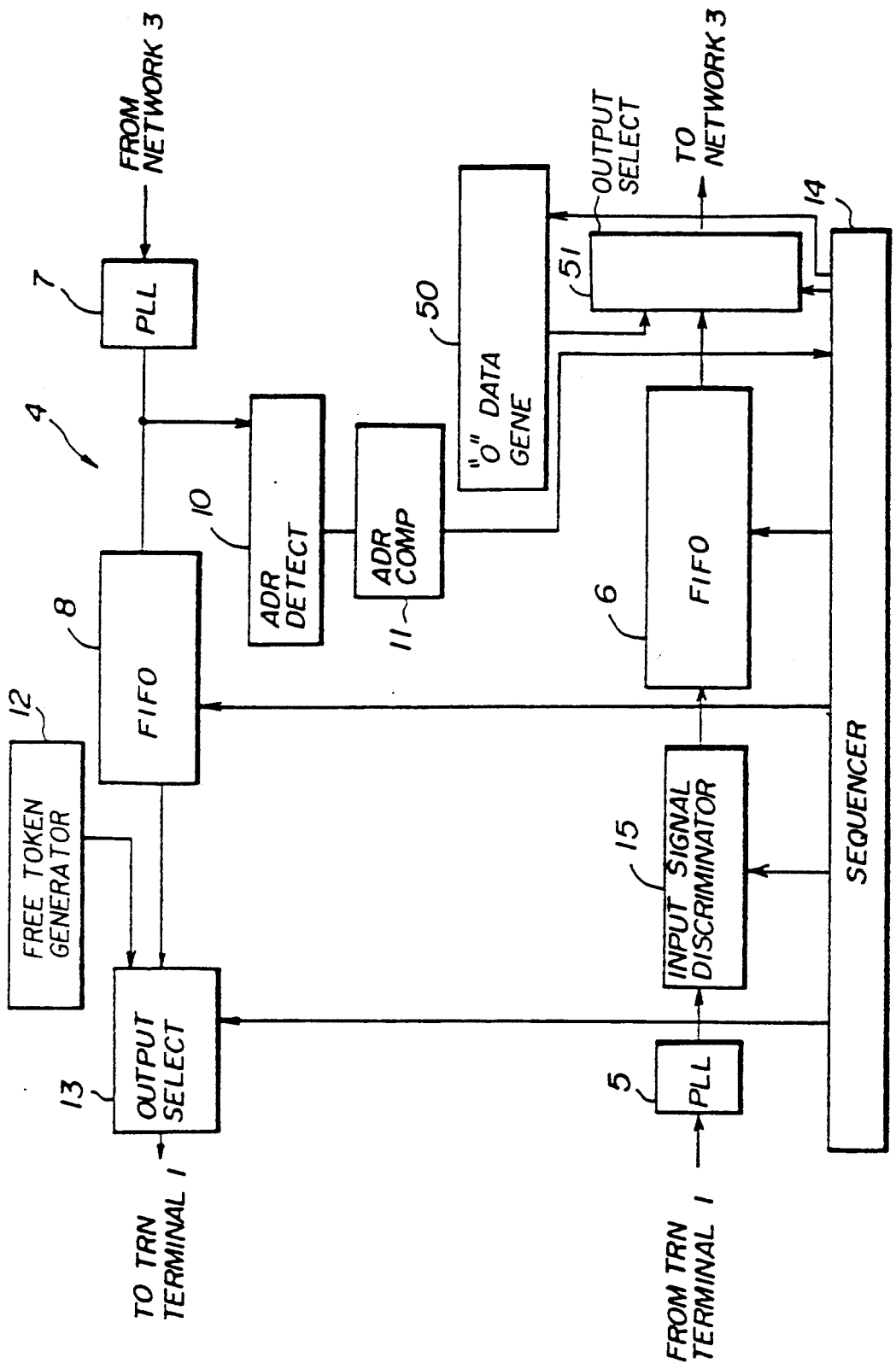
FIG. 17 is a system block diagram showing a sixteenth embodiment of the communication control unit according to the present invention.

Next, a description will be given of a sixteenth embodiment of the communication control unit according to the present invention, by referring to FIG. 17. In FIG. 17, those parts which are the same as those corresponding parts in FIG. 1 are designated by the same reference numerals, and a description thereof will be omitted.

In this embodiment, the input frame from the lattice communication network 3 is subjected to the bit synchronization in the PLL circuit 7 and is stored in the FIFO 8. At the same time, the address detector 10 detects the position of the destination address, and the address comparator 13 compares the destination address with the terminal address. When the two compared addresses match, the input frame is read out from the FIFO 8 in response to a clock signal from a crystal oscillator (not shown) of the TAU 4 if the free token is received from the TRN terminal 1, and the read out input frame is output to the TRN terminal 1 via the output selector 13.

On the other hand, when no input frame is received from the lattice communication network 3, the output selector 13 transmits the free token from the free token generator 12 to the TRN terminal 1 if the free token is received from the TRN terminal 1. When the two compared addresses match, the TRN terminal 1 returns the input frame to the TAU 4 while entering the input frame. The TAU 4 transmits this frame to the lattice communication network 3 via the PLL circuit 5, the input signal discriminator 15, the FIFO 6 and an output selector 51. The sequencer 14 neglects the input frame by not carrying out a write operation with respect to the FIFO 8 until the series of processes described above ends, even if the input frame is received from the lattice communication network 3. Hence, it is possible to prevent the frame from disappearing due to frame collision because the detection of two identical addresses will not be treated as a collision.

According to this embodiment, a "0" data generator 50 is connected in parallel with the FIFO 6 with respect to the output selector 51. Thus, when the address detector 10 and the address comparator 11 detect that the destination address of the input frame matches the terminal address, the sequencer 14 starts the "0" data generator 50. The "0" data generator 50 which is started converts "0" data into a differential Manchester code before outputting the same to the output selector 51. In addition, the sequencer 14 switches the output selector 51 to selectively output the "0" data, so as to output the "0" data to the lattice communication network 3. At the same time, the sequencer 14 reads out the input frame from the FIFO 8 and transmits the input frame to the TRN terminal 1 via the output selector 13. Hence, the path is fixed quickly, and the broadcast time in the lattice communication network 3 can be shortened, thereby improving the communication efficiency.

Particularly because the "0" data which is the same as the preamble of the frame is used as the answer signal, the effect becomes the same as if the preamble is substantially lengthened. In addition, in the TAU of the transmitting terminal which transmits the input frame, the PLL lock-up time can be made relatively long when receiving the returned frame, thereby enabling a more stable operation.

Further, the present invention is not limited to these embodiments, but various variations and modifications may be made without departing from the scope of the present invention.

What is claimed is:

1. A communication control unit for providing an interface between a node apparatus of a lattice communication network and a terminal in conformance with a token ring network standard, said communication control unit comprising:
- first memory means for temporarily storing an input frame from the terminal;
- second memory means for temporarily storing an input frame from the lattice communication network;
- input signal discriminator means, coupled to said first memory means, for detecting a MAC frame which is used for ring management from the input frame from the terminal;
- control means, coupled to said first and second memory means and said input signal discriminator means for controlling operation timings of at least said first and second memory means; and
- a return path for returning the MAC frame to the terminal with a priority over other frame when said input signal discriminator means detects the MAC frame.

2. The communication control unit as claimed in claim 1, wherein said return path passes through said first and second memory means.

3. The communication control unit as claimed in claim 1, wherein said return path takes a route passing through said first memory means and avoiding said second memory means.

4. The communication control unit as claimed in claim 1, wherein said return path takes a route passing through said second memory means and avoiding said first memory means.

5. The communication control unit as claimed in claim 1, wherein said return path takes a route avoiding both said first and second memory means.

6. The communication control unit as claimed in claim 1, wherein said input signal discriminator means detects a free token and a frame and discriminates the MAC frame from the frame.

7. A communication control unit for providing an interface between a node apparatus of a lattice communication network and a terminal in conformance with a token ring network standard, said communication control unit comprising:
- first memory means for temporarily storing an input frame from the terminal;
- second memory means for temporarily storing an input frame from the lattice communication network;
- input signal discriminator means, coupled to said first memory means, for detecting a broadcast signal from the input frame from the terminal;
- control means, coupled to said first and second memory means and said input signal discriminator means for controlling operation timings of at least said first and second memory means; and
- an output path for outputting the broadcast signal to the lattice communication network when said input signal discriminator means detects the broadcast signal.

8. The communication control unit as claimed in claim 7, which further comprises a return path for returning the broadcast signal to the terminal when said input signal discriminator means detects the broadcast signal.

9. The communication control unit as claimed in claim 8, wherein said return path passes through said first and second memory means.

10. The communication control unit as claimed in claim 8, wherein said return path takes a route passing through said first memory means and avoiding said second memory means.

11. The communication control unit as claimed in claim 8, wherein said return path takes a route passing through said second memory means and avoiding said first memory means.

12. The communication control unit as claimed in claim 8, wherein said return path takes a route avoiding both said first and second memory means.

13. The communication control unit as claimed in claim 8, wherein said input signal discriminator means detects a free token and a frame and discriminates a broadcast frame from the frame.

14. The communication control unit as claimed in claim 8, wherein said control means controls said first and second memory means so that a timing with which a frame is transmitted from said first memory means is set independent of a timing with which a frame is transmitted from said second memory means.

15. The communication control unit as claimed in claim 1, wherein said second memory has a capacity which is greater than or equal to a frame length of an active monitor existing MAC frame, and said return path takes a route avoiding said second memory means.

16. The communication control unit as claimed in claim 15, wherein said return path passes through said first memory means.

17. The communication control unit as claimed in claim 15, wherein said return path takes a route avoiding both said first and second memory means.

18. A communication control unit for providing an interface between a node apparatus of a lattice communication network and a terminal in conformance with a token ring network standard, said communication control unit comprising:
- memory means for temporarily storing a frame which is to be transmitted from the terminal to another destination terminal and for transmitting the stored frame to the lattice communication network;
- control means, coupled to said memory means and including timer means, for controlling an operation timing of said memory means, said timer means timing a predetermined time after transmission of the frame to the lattice communication network;
- detector means for detecting a frame which is returned from the other destination terminal; and
- a return path for returning the frame from said memory means to the terminal if the frame is not returned from the lattice communication network within the predetermined time timed by said timer means.

19. A communication control unit for providing an interface between a node apparatus of a lattice communication network and a terminal in conformance with a token ring network standard, said communication control unit comprising:
- first memory means for temporarily storing a frame which is to be transmitted from the terminal to another destination terminal and for transmitting the stored frame to the lattice communication network;
- second memory means for storing the frame when transmitting the frame;

control means, coupled to said first memory means and including timer means, for controlling an operation timing of at least said first memory means, said timer means timing a predetermined time after transmission of the frame to the lattice communication network;

detector means for detecting a frame which is returned from the other destination terminal; and a return path for returning the frame from said second memory means to the terminal if the frame is not returned from the lattice communication network within the predetermined time timed by said timer means.

20. A communication control unit for providing an interface between a node apparatus of a lattice communication network and a terminal in conformance with a token ring network standard, said communication control unit comprising:

detector means for detecting a carrier signal from the terminal;

memory means for temporarily storing a frame which is to be transmitted from the lattice communication network to the terminal and for transmitting the stored frame to the terminal;

control means, coupled to said memory means, for controlling an operation timing of said memory means; and a return path for returning the frame from said memory means to the lattice communication network if the frame is received from the lattice communication network in a state where said detector means detects no carrier signal.

21. A communication control unit for providing an interface between a node apparatus of a lattice communication network and a terminal in conformance with a token ring network standard, said communication control unit comprising:

address comparator means, having a physical address of the terminal, for detecting whether or not a destination address of an input frame from the lattice communication network matches a terminal address of the terminal so as to detect whether or not a destination of the input frame is the terminal; and input limiting means for neglecting an input of other frames from the lattice communication network until the input frame is input from the terminal as a returned frame from the terminal and output again to the lattice communication network when said address comparator means detects the match of the two compared addresses.

* * * * *